US007127261B2

(12) United States Patent
Van Erlach

(10) Patent No.: US 7,127,261 B2
(45) Date of Patent: Oct. 24, 2006

(54) ENHANCED TELECOMMUNICATION SERVICES

(76) Inventor: Julian Van Erlach, 17-15 Hunt Ridge Dr., Clifton Park, NY (US) 12065

( * ) Notice: Subject to any disclaimer, the term of this patent is extended or adjusted under 35 U.S.C. 154(b) by 333 days.

(21) Appl. No.: 10/371,469

(22) Filed: Feb. 22, 2003

(65) Prior Publication Data

US 2004/0204063 A1 Oct. 14, 2004

(51) Int. Cl.
*H04Q 7/20* (2006.01)
(52) U.S. Cl. ............... 455/456.5; 455/41.2; 455/456.3; 709/231; 709/224; 705/14; 705/26
(58) Field of Classification Search ............ 455/456.5, 455/456.3, 41.2; 709/231, 224; 705/14, 705/26
See application file for complete search history.

(56) References Cited

U.S. PATENT DOCUMENTS

| | | | |
|---|---|---|---|
| 6,587,835 B1* | 7/2003 | Treyz et al. ................... | 705/14 |
| 6,859,831 B1* | 2/2005 | Gelvin et al. ................ | 709/224 |
| 6,898,434 B1* | 5/2005 | Pradhan et al. ........... | 455/456.1 |
| 2002/0013852 A1* | 1/2002 | Janik .......................... | 709/231 |
| 2002/0035609 A1* | 3/2002 | Lessard et al. ............. | 709/217 |
| 2002/0088522 A1* | 7/2002 | Uchino et al. .............. | 152/537 |
| 2003/0083076 A1* | 5/2003 | Pradhan et al. ............. | 455/456 |

* cited by examiner

Primary Examiner—Danh Cong Le

(57) ABSTRACT

Methods and platforms are disclosed for providing enhanced telecommunication wireless and wireline services comprising: 1) wireless device location-based personal contact service; 2) digital multi-media telecommunication session documentation; 3) provision of digital product samples according to subscriber-definable criteria and to a wireless device upon reading of a product identifying code with a wireless device; 4) wireless location-based product price, availability and information service; 5) short-range wireless device CRM (customer relationship management) functions; 6) wireless vital sign monitoring service capable of automatic messaging; 7) entertainment event futures determination method and securities market. The invention is physically comprised of a telecommunication platform such as a web-enabled computer, television or other device; or a telephone, cell phone, or wireless PDA that integrates some or all of: a computing apparatus, a digital camera, a data input method from external wireless devices, a network interface capable of interfacing with the Internet and/or a telecommunications network such as a public telephone network, a short-range wireless communication method with other wireless devices, such as Bluetooth, a user interface, a bar code or other product code (such as RFID) reading apparatus and software, a global positioning system (GPS) or other device location determination method, a network service provider and related application hosting facilities, software and databases.

19 Claims, 7 Drawing Sheets

ENHANCED TELECOMMUNICATION SERVICES

BACKGROUND OF THE INVENTION

1. Technical Field of Invention

The invention relates generally to telecommunications services and the growing functional capability of portable, digital, wireless communication devices; and specifically to offering enhanced telecommunication services involving wireless communication devices and service providers equipped with enhanced technological functions. The invention discloses a plurality of unique services and business methods that combine emerging and yet-to emerge technologies in the creation and delivery of value-added services.

2. Description of Prior and Current Art

Wireless service providers and device makers are constantly seeking to create value-added services capable of generating new revenue. Services are in part determined by software and hardware technological capability. The gradual integration into wireless devices of multiple technologies including computing, broadband, still and moving digital image capture, wireless data capture from digital instruments, short-range local networking such as WiFi and Bluetooth, and others enable new classes of services. Currently, such technologies, if utilized at all, are utilized as discrete functions and not integrated services.

Currently, short-message-systems (SMS) are offered by wireless service providers, as are downloadable ring tones, music or video samples, and forwarding of digital image files taken with digital cameras integrated with wireless devices. The invention describes business and technological methods that offer enhanced services.

SUMMARY OF THE INVENTION

The invention discloses a plurality of such enhanced services combining enhanced capabilities of portable communication devices and enhanced service provider capabilities. An object of the invention is to create demand for data-intensive wireless content transmission, thus enhancing the economics of enhanced wireless services and adoption of new technologies.

In a first aspect, the Invention discloses the business method of location-based personal introductions and profiles via wireless devices. Enabled by device-integrated global positioning, the invention discloses the business method of enabling users to send and receive personal introductions to one another through a wireless network using their wireless devices, having specified a location or distance from themselves as an operative criteria. The operative means specified by the invention is enabling the user to determine the geographic location of profiles that the user wishes to view, the distance from oneself that the user wishes to send his or her profile, or the distance from oneself that the user wishes to receive or be notified of other subscribers who meet a specifiable criteria set and whose registered devices meet the user's location specification at that time.

In provisional filings 20010026609 Weinstein et al., and 20010046657 Dorn, teach personal wireless introduction methods which in both cases lack a) a method and system to route personal introductions and responses according to user-determinable distance from either the sender or the recipient in addition to personal criteria offered and sought, b) a means to create a multi-media personal ad directly on and through said platform, and c) a database that is dynamically updated for user and subscriber geographic position information used in part to determine the routing of said personal introductions. Dorn teaches a method whereby user platforms only exchange information when in short wireless range of each other, such as the range of Bluetooth transmission.

Today's subscribers increasingly use telecommunication services for business or other valuable conversations, often while using or desiring to use imaging and computing devices and digital instruments. A need is gradually emerging to integrate such data forms into a single telecommunication session digital transcript containing the source of caller ID of each data input, the caller's time of data input, date and location from which the input was made. In a second aspect, the Invention teaches that such a digital transcript permits the creation of a full and complete chronological record of all of the data inputs possible with current technology. This transcript will become a crucial business and interpersonal tool in the near future; affording multi-media documentation of call-session events.

This need is manifest by the multiplicity of devices carried and used by people and the inability to integrate the data created or captured by such devices into a usable digital document directly. Such a need is even more urgent when telecommunication is involved among various parties wherein documentation of such telecommunication is impossible for speech and ad hoc for image and data. No platform exists for integrating these various inputs during a single call session.

In business, science and other fields, people often exchange crucial information over wireless communication networks. When they later need to refer to this information, they must resort to memory, notes and voice recordings in the absence of a comprehensive, integrated call-session transcript. The invention discloses a method to create such a transcript, integrating multi-media components.

In a third aspect, the Invention discloses a method of providing digital product samples or information to subscribers based on a subscriber-definable criteria set. Such criteria may be music, video, book, or game genres that a subscriber wishes to receive samples of new release content in any digital form, including text and multimedia. Samples may be sent as attachments to an email, as links to a web site from which they are streamed, or other means. In a further manifestation, the Invention discloses a method of serving digital product samples or information to a wireless device upon the reading or entry of a product identifying code such as RFID, or barcode by or into an appropriately equipped wireless device. A software program when enabled, accepts the reading or entry of such a product code, transmits the data to a local or remote server as a request for available digital multimedia samples such as music, game or video clips or text. Thereupon, the product code is matched to codes stored in a database and cross-referenced to appropriate samples; and the sample are served to the wireless device originating the request. Such a transaction may occur in a retail store with a shopper reading a barcode of a music compact disk with a wireless device equipped with digital camera and software. Samples of music contained on that compact disk are served to that wireless device. The device user interface may configure to allow the user control of which tracks the user wishes to listen to samples of. Both the sample content and the wireless serving capability may take place locally via a local network and server via short-range RF such as Wi-Fi or Bluetooth, or via traditional wireless network, or a combination of local and broadband to Internet mixed channel network.

In a fourth aspect, the Invention discloses a location-based product price and availability determination means through an appropriately equipped wireless device. Shoppers find it difficult to compare product price and availability for desired products when shopping in a particular commercial establishment. The invention discloses a wireless method, coupled with a capability of a wireless communication device to read a product code and send a query to a service provider to identify availability and prices of said product within a user-defined distance or in a user-specified geographic region. As in aspect three above, a user reads or enters a product code with or into a wireless device and selects a user interface option that allows a price and inventory lookup within a user-defined distance from the geographic position of the device as determined by global positioning systems. A service provider maintains or has access to a database updateable by merchants with both the geocoded location of the merchant and inventory and price data of items identified by common product codes such as bar codes or RFID. The Invention further anticipates a bargaining feature between customers and merchants to close a purchase transaction.

In a fifth aspect, the Invention discloses short-range customer relationship management functions incorporating a means of recognizing and identifying the presence of a specific wireless device and cross referencing that identity to demographic information about the registered owner or user, and transaction data with said owner or user specific to the owner of the establishment and that device owner or user. When that association is made, a local wireless or wireline server can serve messages to the wireless device or drive the content of a local smart sign proximal to the user of the wireless device; perhaps offering personal recognition or special promotions.

Merchants will increasingly deploy smart, computer-driven displays, equipped with wireless transmission capability, visible to shoppers. The invention discloses a means for a smart display and a shopper carrying a smart device equipped with short-range wireless capability, such as Bluetooth, to view or receive targeted content via said smart display or directly to the wireless device. When coupled with identifying information about the device or shopper, matched and retrieved from a database containing a profile and transaction history of a shopper, the smart display can offer highly tailored information and offers to said shopper. Atkinson in provisional filing 20010054180 discloses a system for synchronizing the output of media in public places using interaction among wireless smart devices and smart displays, but does not teach a method wherein the content of a smart display is wholly or partly determined by the steps of matching a user or device identification to a user profile and/or transaction history in a database, and a logic engine that modifies smart display content with respect to said information.

In a sixth aspect, the Invention discloses a means of wireless vital sign and location monitoring enabled to communicate continuously, periodically or on exception conditions to specified telephone or internet addresses as messages through a local wireless network connected to a telecommunications services carrier or the Internet. The invention comprises a wireless vital sign and/or location monitor, such as GPS, a means of wireless communication between the wireless monitor and a digital telephone or computer connected to the Internet and software enabled for programming with telephone numbers and Internet addresses to receive either ongoing messages or, messages for exception conditions only. If a vital sign parameter such as body temperature, distance from a specified location, or other parameter is violated, the wireless monitor emits a message to a local digital telephone or computer connected to the Internet. Software directs the transmission of the contents of the exception condition and time as a message to one or more programmed telephone numbers or Internet addresses according to a definable sequence and timing pattern. Said monitor system may also be programmed to transmit routine "all normal" messages. In a further embodiment, said system may be bi-directional with enablement of remote inquiry of conditions monitored by said system and the transmission of said data to the device from which the inquiry originated.

In a seventh aspect, the Invention discloses a means of creating and maintaining an event futures market; similar to a stock market, through the Internet and/or a wireless network. The Invention comprises one or more hosted Internet sites capable of user interaction and containing history in support of an event futures market. Subscribers or users enter estimates of the outcome of a future event. Based on a mathematical permutation of past and current user estimates an aggregate index of a recent value, such as a median or average value of estimates is created. In one manifestation, user/subscribers enter estimates of the sales over a defined future period of an upcoming music new release by a known artist. As radio play and TV appearances increase, estimates may also increase, as does the value of the index. A product future security is derived from the index of estimates before actual sales begin. Estimates pertain to a definable period of time such as a first week of sales. This security may be assigned a monetary or other commercial or reward value. Users/subscribers with the closest estimates to actual may be eligible to win prizes. Alternatively, a marketplace for said security may be created where users/subscribers may buy and sell this futures security at the current value determined by bid/ask methods, using money, credit or other forms of perceived value. Distributors of music, video, games and books may in part adjust sales and manufacturing forecasts and production runs based on the value of these product futures. Values of new release-related future sales expectation indices may fluctuate in real-time with the values of more recent estimates and associated transaction values. Composite indices may be created for music, film or video releases, games and books. Further subdivisions may be created for genres. Index or specific product futures values may be provided to television audiences as a kind of "ticker tape" broadcast during shows and be made available through the Internet. A site hosting the futures market would comprise historical sales information by artist, title, time period, genre, and supply other relevant data such as concert and television appearances and radio or television play as well as a history of estimates before actual sales began. This information may be provided in data table or graphic form to users to assist their evaluation of potential performance. The value of a future for a product or an index will be a function of the latest bid and ask prices from owners and would-be purchasers of these securities. In most respects, these futures will operate like a stock market. Expert opinions and reviews may also be provided as well as relevant news feeds. Specific futures values and index values may be provided on the Internet and as a streaming or messaging service through wireless networks to wireless devices.

DETAILED DESCRIPTION OF DRAWINGS AND PREFFERED EMBODIMENTS

A more complete understanding of the method and apparatus of the present invention may be had by reference to the following detailed description when taken in conjunction with the accompanying drawings wherein the diagrams disclose the functions and systems necessary to provide said methods and services. However, it is understood that this class of embodiments provides only a few examples of the many advantageous uses of the innovative teachings herein. In general, statements made in the specification of the present application do not delimit any of the various claimed inventions. Moreover, some statements may apply to some inventive features but not to others.

Figure 1:
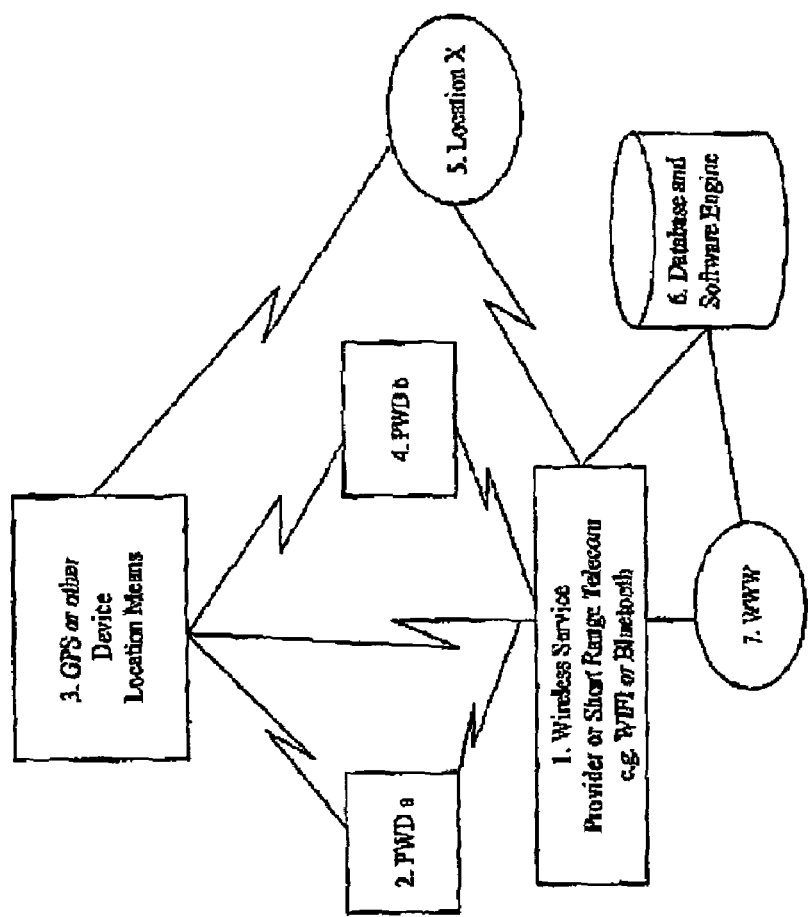
FIG. 1: depicts a platform and network for the operation of a location-based wireless personal introduction method and the various components requisite for operation.

FIG. 1: Wireless Location-Based Personal Contact Service; comprises: 1) wireless service provider which includes traditional cellular carriers as well as short-range (WiFi; Bluetooth) to broadband/Internet networks; personal wireless telecommunication devices (2, 4); (3) a position determination means such as GPS; (5) an exemplary geo-coded location definable by a means recognizable by a geocoding process such as distance radius from a given geographic reference point; (6) a database and software engine; and (7) the World Wide Web or Internet. A subscriber with device (2) has registered with a service provider (1) to engage in personal introductions with appropriate personal profile information and filter criteria for accepting personal profiles from other registrants and having provided his own. Upon entering a mall, the registrant with device (2) queries the service provider (1) for all criteria-meeting individuals with a GPS-determined distance from himself, who will allow their profiles to be viewed and whose registered devices are within that distance. The service provider provides registrant with such profiles including that of registrant with device (4). First registrant decides to contact second registrant and issues instruction to service provider to forward his personal profile to second registrant who has indicated an open to receive personal introductions status. Alternatively, first registrant may query service provider to supply all open to be viewed profiles meeting a definable criteria for a specified region (5), again defined by a means recognizable to a geocoded digital map domain. Service provider has access to a database and software engine (6) or to the Internet (7) from which personal profiles, registration information, device identification, status, and GPS-location information and software necessary to support search and match criteria reside and are updated. Information may flow through a cellular network or through the Internet via broadband channels and through local wireless service such as WiFi or Bluetooth to and from said personal wireless devices. Personal profiles may be previously created and stored on or off a network, or be created directly on a personal wireless device. This may be a paid service. Portions of the provision of personal profiles may be anonymous until either or both parties agree to provide specific personal name and contact information.

Figure 2:
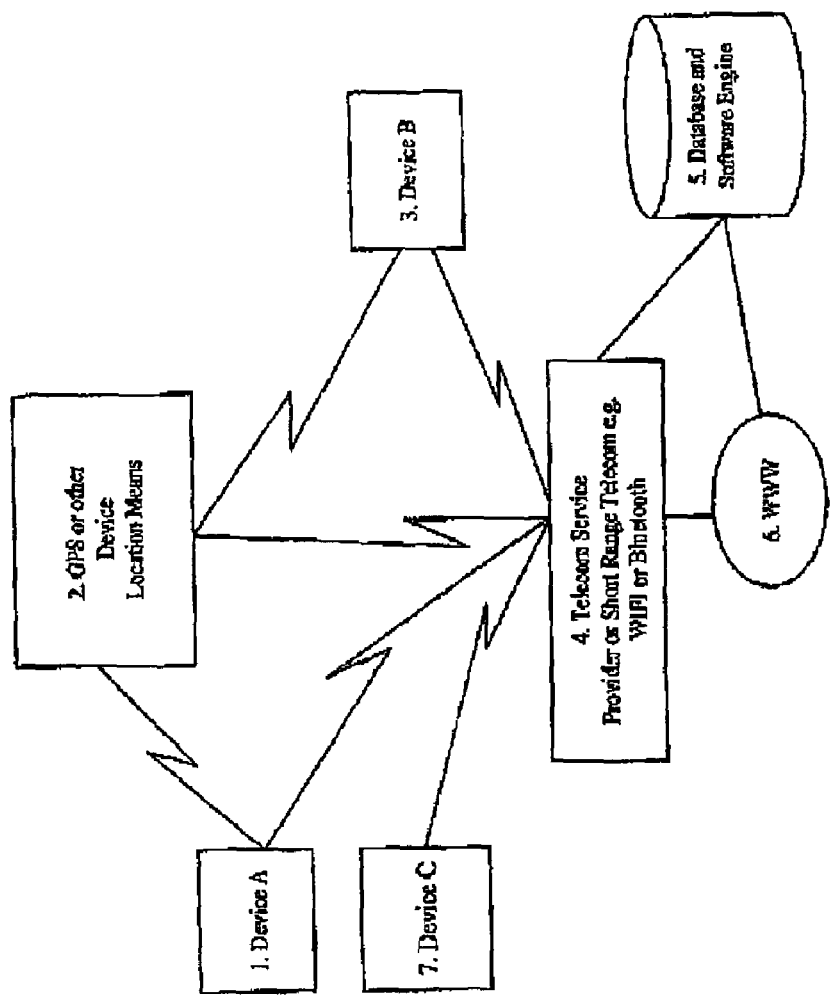
FIG. 2: depicts a platform and network for the creation of digital multimedia documents of a communication among parties through a digital telecommunications network.

FIG. 2: Digital Multimedia Telecommunication Documentation Service; comprises: a global positioning means such as GPS (2); one or more telecommunication devices (1, 3, 7); a telecommunication service provider (4) with access to a database and software engine (5) capable of storing, collating, serving and other functions related to digital documents; and the World Wide Web (6). Speech, text, sound, image and data input from telecommunication devices are merged into a referencable digital document either in the telecommunication devices or by the service provider as they are streamed from said devices. Thus a user of device A (1) while interacting with the user of device B (3) may be speaking, taking video images and transmitting data read into his wireless device via short-range RF (e.g. Bluetooth, WiFi) from a digital instrument. Rather than being merely discrete digital files, these elements are integrated into a digital document incorporating speech-to-text, image, sound, and data complete with references to the source device ID, time sequence and location. At any time, this digital document may be emailed to specified addresses, referenced remotely from a server, manipulated or integrated into other documents. The composition of the document includes speech-to-text converted material, digital images, digitized sound, digital data and representation of other data, such as physical forces, in digital form. Time and geographic location indication may be provided as well as the device serving as the source for any item of data at the time it was provided. At any time during or after a telecommunication session, any authorized party may access the digital document of that session from any device connected to an appropriate network, such as (7) device C that may be a personal computer connected to the Internet.

Figure 3:
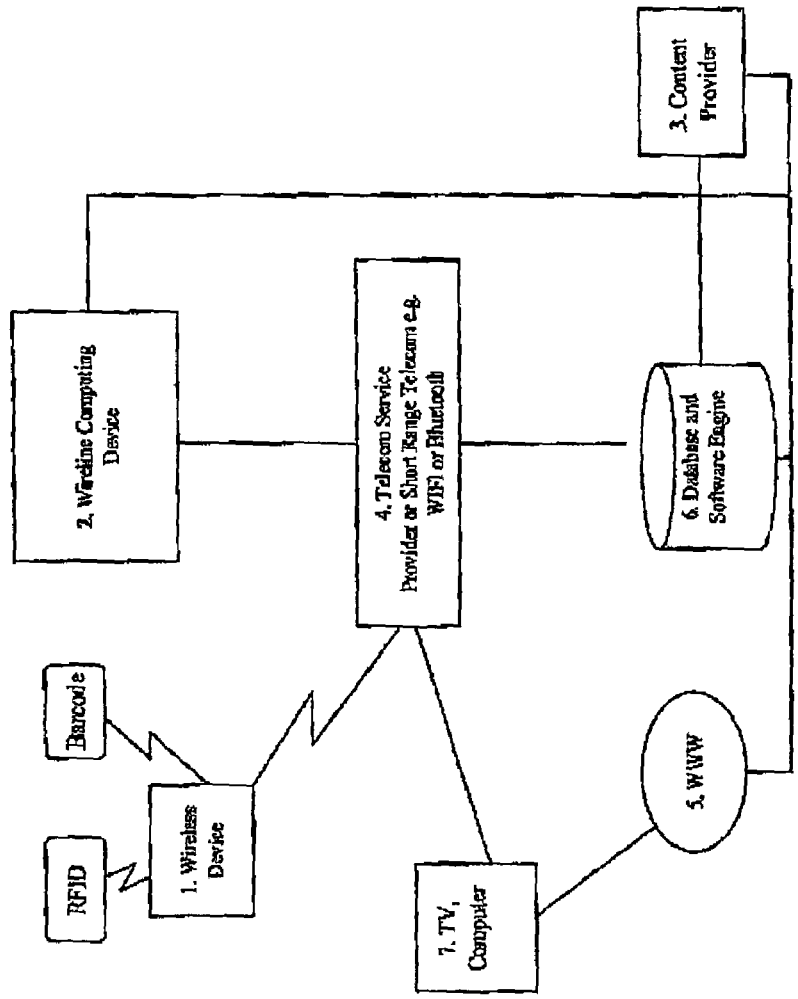
FIG. 3: depicts a platform and network for the generation of requests for and delivery of digital samples of digital product, or information about products, according to user-specified criteria or the reading of a product identifying code with a wireless device.

FIG. 3: Provision of Digital Product Samples According to Subscriber Criteria and to a Wireless Device Upon Reading of a Product Code; comprises: a wireless device or landline device capable of Internet access such as a computer or television (1, 2, 7); a content provider (3); a telecommunication service provider (4); the Internet or World Wide Web (5); and a database server and software engine (6). A subscriber may register to receive samples of new digital content such as music, video, games, books or product information according to specified criteria from a content provider through the Internet or a wireless service provider serving content from the content provider. The wireless service and content provider may be a retail establishment broadcasting short-range RF such as WiFi. Alternatively, a user of a wireless device (1) equipped with capability to read a product code such as a RFID (radio frequency identification) or barcode using RF technology, optical scanning or digital camera technology, is enabled to select a service providing said user with sample digital content associated with said read product code. A registered user who has specified the addresses to which he wishes that samples be sent, such as device (1) receives regular digital samples of digital product such as music, film, game or book new releases according to user-selected criteria filters. The user may then select to purchase via download, order physical shipment, indicate desirability of the sample, recommend and forward the sample to other contacts and potentially receive value in exchange for the forwarded recommendation or the future purchase activity of recommendees. Content is provided by a content provider such as a music distribution company (3) and stored and updated in one or more databases accessible by a telecommunications service provider (4). A software engine (6) triggers distribution of said samples according to stored registrant criteria and designated addresses. Forwarded samples may be cross-referenced against a master database of registrants and incentives provided to the forwarder according to the status of the forwardee in said database.

Figure 4:
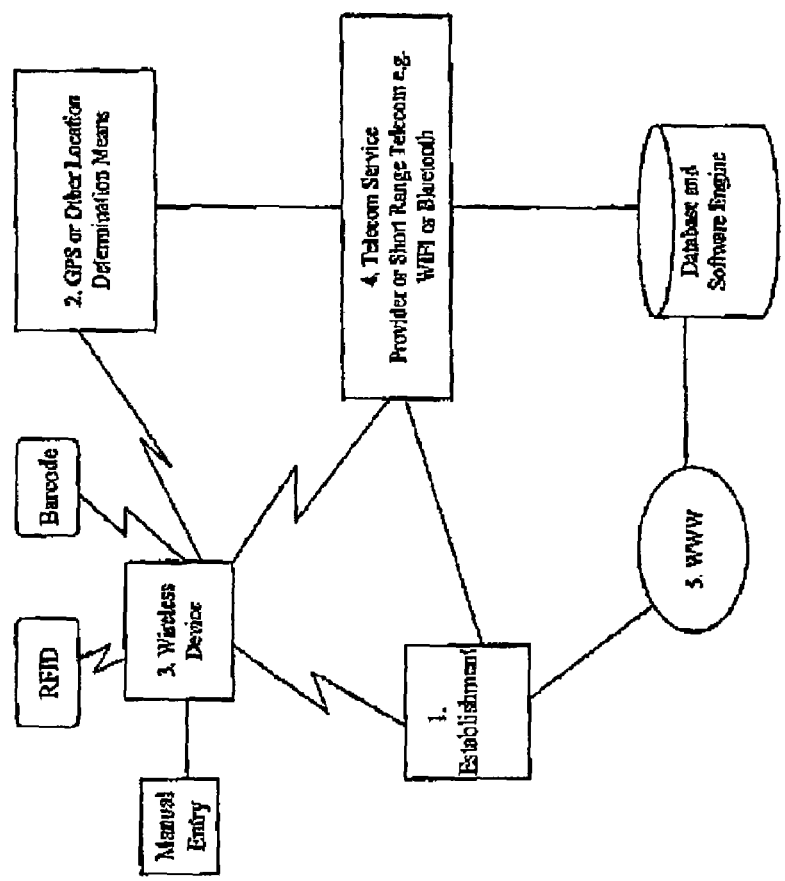
FIG. 4: depicts the platform and network for the generation of requests for and delivery of data concerning the location, availability and price of products according to a user request generated through a wireless device equipped with geographic positioning technology and the reading or entry of a product identifying code by a user into or with a wireless device.

FIG. 4: Wireless Location-Based Product Price, Availability and Information Service is a variation of the service of FIG. 3 and comprises: one or more establishments (1) with content pertaining to products carried in their inventory, prices, inventory status, and geo-coding of the establishment address stored in one or more databases accessible through the Internet or a wireless service provider (4); (2) a global positioning means capable of determining the geographic position of a wireless device (3) that is enabled to read a product code such as an RFID or barcode and further enabled to select a service provided by a telecommunication service provider that references a read product code and a specified distance from said wireless device or specific location against an updateable database of establishment locations, inventory and price information associated with said read product code and provides said information to the wireless device. This service may be further provided in whole or in part through the Internet (5). A wireless device user informs a network service provider that he wishes to use product information and location services through a hardware or software function of the wireless device. The user then proceeds to read a product identifying code or to manually enter that code with or into the wireless device. The user further instructs the service provider of the type of query desired; such as a product price and availability query within a given radial or driving distance of the device he is carrying. The service provider queries accessible databases including through the Internet to determine product information, inventory and price availability according to geo-coded information made available by or for retail establishments as compared to the user's current location and geocoded maps of radial and driving distances. Results are relayed to the device the user is using. The relayed information may include the names, contact addresses, locations, driving directions, product availability and price of establishments with inventory matching the users' query.

Figure 5:
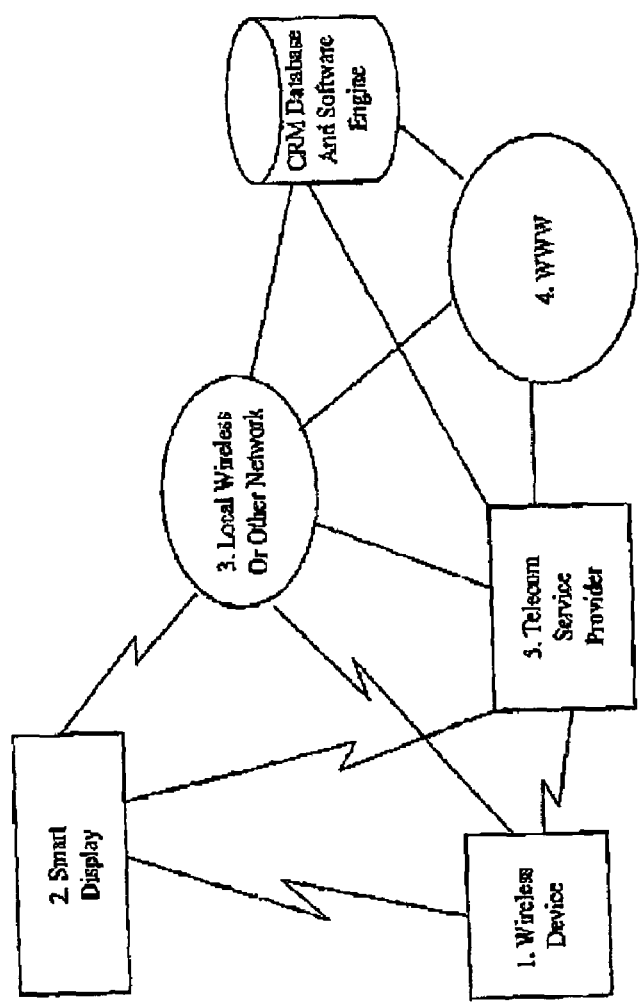
FIG. 5: depicts the platform and network for short-range digital interaction among wireless devices and smart customer-service or information provision systems.

FIG. 5: Short-Range Wireless Device-Related CRM Service; comprising: a wireless device(s) (1); a smart display or transmitter (2) controlled by a local smart wireless network server (3) with access to a customer relationship database and software engine; the Internet (4); and a telecommunication service provider (5). Within a given proximity to a local wireless server network (3), a wireless device (1) is detected and the ID of said device is obtained, or information relayed by the device about the identity of its owner or user is obtained and cross-referenced to an internal customer database (3) or is researched through the Internet (4) or a database of the telecommunications service provider (5). Identifying information is further referenced against transaction history associated with said device or with an known owner of said device or with demographics provided by a telecommunications service provider (5) about the owner of said device. Based upon criteria programmed into a CRM (customer relationship management) server, content is displayed on a proximal smart display or transmitted to the proximal wireless device. For example, a customer identified through the identity of the wireless device he is carrying or information supplied by the smart device to a local wireless smart server, may see on a proximal smart display driven by the local server, or have transmitted to his wireless device, a promotion targeted to him based on his demographics and/or transaction history with the retail establishment that he has entered.

Figure 6:
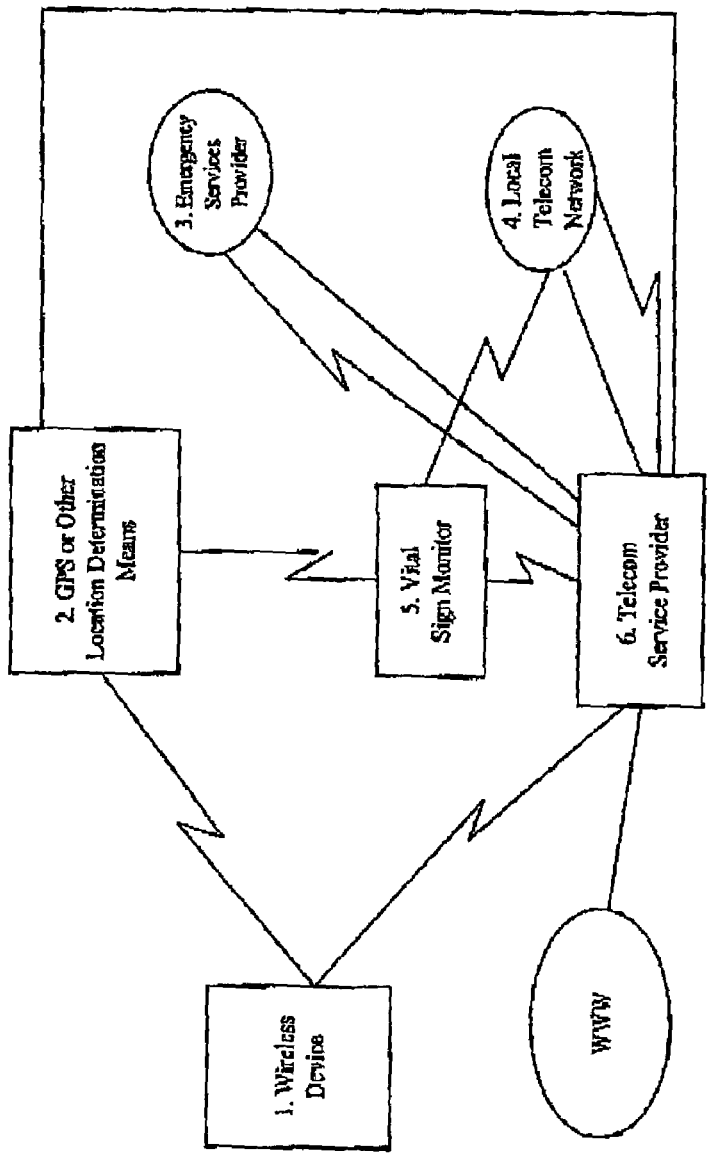
FIG. 6: depicts the platform and network for the wireless provision of information about vital signs and location of living beings or property as messages provided to predetermined telephone or Internet addresses.

FIG. 6: Wireless Vital Sign Monitoring; comprising one or more wireless devices (1); a geographic position determination system such as GPS (2); an emergency service provider such as police or medical (3); a local wireless network (4) connected with a regional, national or global telecommunications service provider (6); and a wireless vital sign monitor (5) that is attached to, implanted in, or remotely monitors vital signs and location of a living being. A vital sign monitor monitors vital signs and/or location of a subject in real time or over sample time periods. If predetermined parameters are violated, the monitor wirelessly instructs a local telecommunications node such as a digital telephone or computer connected to the Internet and equipped with WiFi or Bluetooth or related technology and enabled to detect and act upon said wireless monitor instruction; to contact pre-determined addresses. These addresses may be wireless, or landline, private or belonging to emergency service providers such as police or medical services. Thus if an infant wearing such a monitor and in the care of a babysitter registers an exceptional temperature (hot or cold), the monitor contacts a local telecommunications device such as a digital telephone or computer connected to the Internet and enabled with local wireless network capability via the likes of WiFi or Bluetooth. The combination of the exceptional vital sign or location reading of the subject, and programming of the digital telephone instruct the telephone to message such as SMS (short message system), in a specifiable sequence to a series of telephone numbers or Internet addresses.

Figure 7:
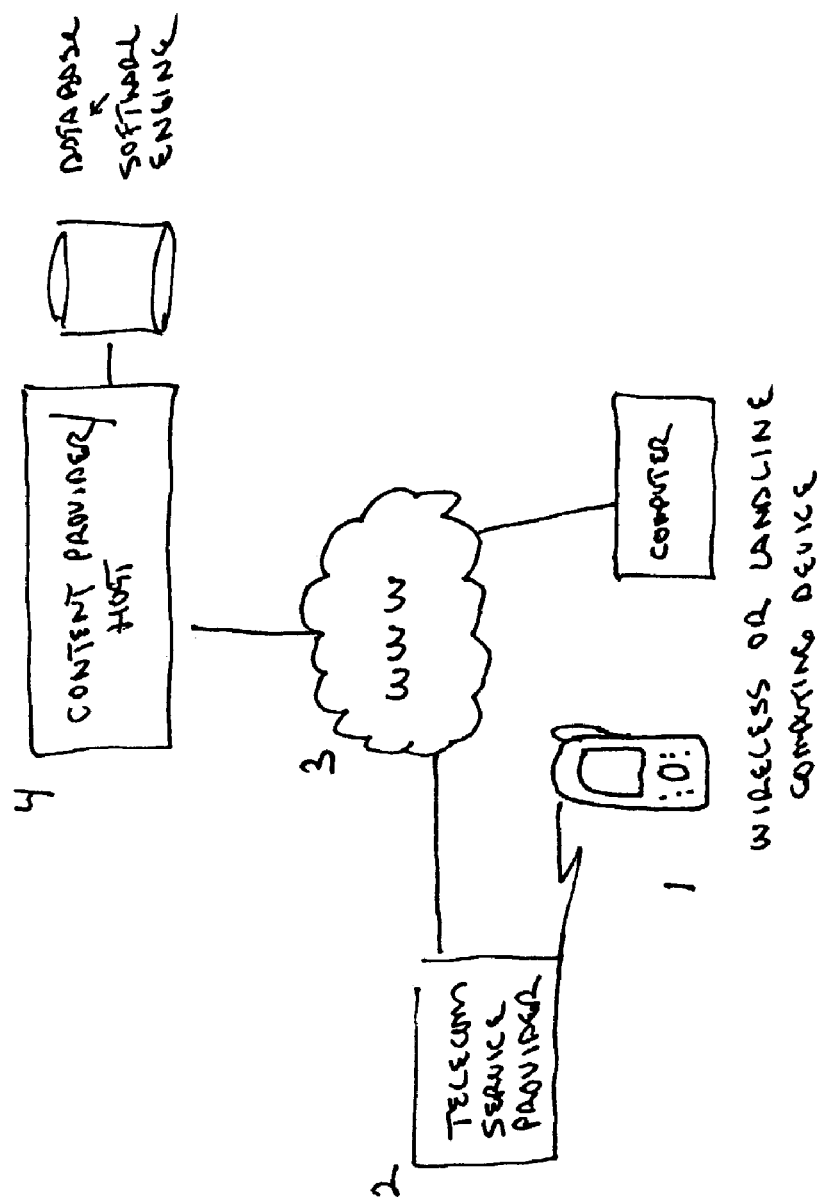
FIG. 7: depicts the platform and network for the creation, management and distribution of a securities market related to expected outcomes, such as sales, of events such as entertainment events.

FIG. 7: Entertainment Event Futures Determination Service; comprising: wireless or wireline computing devices capable of telecommunication through the Internet or other network, telecommunication services providers, content providers and a database and software engine comprising a hosted facility enabled to create a securities market derived from user estimates regarding the outcomes of future events or transaction prices of securities representing expected values of future outcomes of events such as sales of specific entertainment products such as compact disks, DVDs, games, books or indices created therefrom. A user or subscriber employing a device (1) connected to a network or the Internet visits a hosted facility supporting said event futures market (4) via the network of a telecommunications services provider (2). The hosted market may comprise digital samples of the product yet to be introduced for sales at a future date such as a specific book, CD, DVD, game, movie event, etc.; and user-accessible history of sales over definable periods of time for like and other products; including history of derived security prices, radio and television play and other related data and events in support of the user forming a reasoned opinion of the potential sales of said product; and further comprise the necessary software to create and maintain a securities trading marketplace. A security based on said product may trade like a stock where buyers and sellers bid to determine its value and exchange a unit of value which may be monetary or otherwise. Host sponsors may offer incentives to market participants and use the value of said product futures-derived securities to adjust their sales and production plans. Furthermore, market participants may be required to, or willingly supply demographic and location data about themselves, which data may be further used by product sponsors to refine marketing, distribution and other plans.

As will be recognized by those skilled in the art, the innovative concepts described in the present invention can be modified and varied over a wide range of applications. Accordingly, the scope of patented subject matter should not be limited to any of the specific exemplary teachings discussed, but is instead defined by the inherent claims.

I claim:

1. Methods and platforms for providing enhanced telecommunication services comprising:

a wireless device-based, specified location-based interpersonal contact initiation and personal information reviewing and exchange, further comprising multiple wireless devices equipped with geographic location determination technology, a global positioning system, a wireless network provider, and databases and hosting engines containing user personal profiles and transaction criteria logic wherein a user of a wireless device specifies at least one of a desired distance from one's device or a specific location regarding the transmission of one's own, or the reviewing of other personal profiles.

generating a multimedia digital document of a telecommunication session comprising at least one correspondent, a telecommunication service provider, a software engine and database, and enabling software and hardware means of converting speech to text, image, sound, and data into an integrated digital document of said telecommunication session which may then be referenced in whole;

providing digital product samples to wireline and wireless electronic devices, including but not limited to music, video, games, books, and product images and information based a recipient definable filter criteria for receiving such samples, including but not limited to genre, category, type or other product characterization and a further means of providing said samples upon the reading of a product identifying code by a user with a wireless device and requesting said samples associated with said product identifying code;

providing to wireless devices equipped with global positioning technology, product specific price, availability and descriptive or related information upon a reading of a product identifying code such as a bar or RED (radio frequency identification) code with such a device or manual entry of said code into such device by cross-referencing said product code to an updateable database of geo-coded merchant locations, inventory status and prices Short-range wireless CRM (customer relationship management) comprising the local recognition of the proximity of a wireless device through RF technology including Wi-Fi and Bluetooth, the obtaining of information about the user or owner of said device by a local wireless network server from the wireless device, the cross-referencing of that information to internal or external databases and the consequent serving of customized content to a local digital smart sign viewable by said user, or serving of said content to said wireless device providing a wireless living being vital sign and location monitoring and related messaging service comprising a first device capable of monitoring one or more vital signs or location of a living being, global position determination technology, a local wireless network, digital telecommunication devices addressable by said wireless vital sign monitor and programming of said digital devices enabling the transmission of vital sign status messages under user specifiable parameters to definable telephone or Internet addresses.

2. A method of claim 1, wherein a service provider provides a personal introduction and profile viewing service to users of wireless devices equipped with global positioning technology wherein the receipt, viewing, or transmission of personal messages and profiles is a function of user-specified location of the devices of other users or subscribers, or distance from one's own wireless device.

3. A method of claim 1, wherein a service provider or host maintains and updates a database of users, user profiles and the location of registered user devices in real time or at intervals of time through the use of global positioning or other location determination technology for wireless devices and establishes an association of said device location with said user profiles.

4. A method of claim 1, wherein a service provider or host maintains a log and records a history of interpersonal communications according to location criteria.

5. A method of claim 1, wherein a service provider provides on request the personal profiles to a user of those persons who frequently call from a user-definable geographic area but whose wireless devices are not presently located within that area.

6. A method of claim 1, wherein a service provider digitally integrates the speech-to-text for one or more languages into one or more other languages, image, sound and other digital data, including location at the time of data generation, generated by participants of a telecommunication session into a digital document containing a chronological or other user specifiable arrangement of said data into said digital document.

7. A method of claim 1, wherein said digital document is accessible from a remote location by an electronic device or is transmitted to such a device upon user request.

8. A method of claim 1, wherein said integrated digital document services is provided for a fee to users or subscribers.

9. A method of claim 1, wherein said integrated digital document is referencable by one or more user names during the communication session, date and time of generation, key words or phrases contained, location of data generation, or telephone number or other network address.

10. A method of claim 1, wherein a service provider provides digital product samples or product reviews to electronic devices of new or yet to be sold products or services, including but not limited to music, video, games and books, according to user-specified criteria regarding said product, including but not limited to genre, type and category; where said user criteria may be incorporated into a subscription service.

11. A method of claim 1, wherein said samples are emailed as attachment files; web links or hosted on an Internet site customizable according to said user criteria.

12. A method of claims 1, wherein a content provider offers and provides consideration for the referral of digital samples by a recipient to a third party.

13. A method of claim 1, wherein a wireless network service provides to a wireless device digital product samples according to a product identifying code such as RFID, barcode or magnetic code, read by, or entered into a wireless device by a user wherein said network may be cellular or local, and wherein said digital samples are stored on a database server and indexed by a product identifying code such as and RFID, barcode or magnetic code, and a logic engine serves said samples to said device upon matching said product codes.

14. A method of claim 1, further providing to wireless devices equipped with global position determination technology, product-related information, including price and inventory availability, upon a user reading or entering into said wireless device a product identifying code such as an RFID, barcode or magnetic code, and requesting a service provider to perform a lookup type according to a distance criteria selected by the user, from the location of said wireless device of available inventory matching said product code.

15. A method of claims 1, further service provider maintaining and updating a database of inventory and prices cross-referenced to product identifying codes such as RFID, UPC, barcodes or other codes and according to the geocoded locations of merchants reporting said inventory and price status; and further cross-referencing said data with the wireless look-up requests from users with wireless devices according to user-defined radial or driving distance criteria from the current location of users' wireless devices, further cross-referenced to geocoded maps of establishment locations and driving distances.

16. A method of claim 1, further comprising wireless or wireline short-range provision of content to a local smart sign or wireless device by a local smart wireless network upon obtaining user or owner-identifying information from the proximal wireless device to the network.

17. A method of claims 1, wherein said smart local network obtains a wireless device identification, or user or owner information from said wireless device and cross-references said identifying information to internal transactional or customer databases, or to external device registered owner databases.

18. A method of claims 16, wherein content is served to a proximal smart sign or said wireless device based in whole or in part on information obtained about the owner or user of said wireless device from a transmission of, or other information obtained about said wireless device and its registered owner.

19. A method of claim 1, further comprising the steps of a wireless living being vital sign or location monitor effecting the transmission of an electronic message to specified telephone or Internet addresses through a local wireless network connecting digital telephones or computers connected to the Internet which network is programmed to send said messages upon one or more of regular time intervals, or exception conditions regarding pre-determined values of vital signs or location of the subject and further containing the values of one or more vital signs and location.

* * * * *